United States Patent
Barthalow

[19]

[11] Patent Number: 6,161,638
[45] Date of Patent: Dec. 19, 2000

[54] WORK TRANSFER LOCK SYSTEM AND METHOD THEREOF

[75] Inventor: Henry David Barthalow, Greencastle, Pa.

[73] Assignee: Grove U.S. L.L.C., Shady Grove, Pa.

[21] Appl. No.: 09/212,597

[22] Filed: Dec. 16, 1998

[51] Int. Cl.[7] .............................. B62D 11/00; B62D 1/02; B62D 5/02

[52] U.S. Cl. ........................ 180/6.6; 180/638; 180/327; 180/447

[58] Field of Search ................... 180/6.58, 6.38, 180/6.4, 6.32, 6.6, 400, 447, 329, 326, 327

[56] References Cited

U.S. PATENT DOCUMENTS

| Re. 31,500 | 1/1984 | Brownfield . | |
|---|---|---|---|
| 1,717,757 | 6/1929 | Brey . | |
| 2,387,268 | 10/1945 | Huston et al. | 180/6.58 |
| 2,604,175 | 7/1952 | Burdick et al. . | |
| 3,185,316 | 5/1965 | Bennett . | |
| 3,599,814 | 8/1971 | Brownfield . | |
| 3,910,370 | 10/1975 | Mecklenburg et al. . | |
| 4,016,948 | 4/1977 | Kuester . | |
| 4,140,199 | 2/1979 | Lester | 180/326 |
| 4,175,449 | 11/1979 | Manning . | |
| 4,318,451 | 3/1982 | Liggett . | |
| 4,516,655 | 5/1985 | Donahue et al. . | |
| 5,226,497 | 7/1993 | Beaton . | |
| 5,664,909 | 9/1997 | Lindgren et al. | 180/327 |

FOREIGN PATENT DOCUMENTS

| 0443898 | 8/1991 | European Pat. Off. . |
|---|---|---|
| 2167825 | 8/1973 | France . |

*Primary Examiner*—Brian L. Johnson
*Assistant Examiner*—Matthew Luby

[57] ABSTRACT

A work transfer lock system and method includes a first work device, a second work device, a first platform, and a second platform. The system includes a locking device which locks the first platform relative to the second platform. The locking device further includes work transferring mechanisms which transfer work from the first work device to the second work device when the first platform is locked relative to the second platform.

19 Claims, 5 Drawing Sheets

WORK TRANSFER LOCK SYSTEM AND METHOD THEREOF

BACKGROUND OF THE INVENTION

1. Field of Invention

The present invention relates to a work transfer lock system and method for engaging and disengaging work devices while locking and unlocking relatively moveable platforms such as a rotating superstructure of a crane.

2. Description of the Background Art

The conventional art of FIG. 5 illustrates a cab 3 which is mounted on a superstructure bearing base plate 16. Superstructure bearing base plate 16 is rotatably mounted on a carrier bearing base plate 18. The superstructure bearing base plate 16 is rotatable about a rotation axis AA. The superstructure bearing base plate 16 can rotate either clockwise or counter clockwise as indicated by directional arrow R. When the cab 3 and the superstructure bearing base plate 16 are not rotated, an operator can steer a carrier chassis 19 with a steering wheel 6. The carrier chassis 19 includes a steering box 14 which is operatively linked to the steering wheel 6 when an operator desires to steer the chassis 19 from the cab 3.

The hardware between the steering wheel 6 and steering box 14 is disconnectable so that superstructure bearing base plate 16 can rotate relative to the carrier bearing base plate 18 and the carrier chassis 19. To prevent rotation of the cab 3 and the superstructure bearing base plate 16 relative to the carrier bearing base plate 18 and the carrier chassis 19, a lock pin 4 is employed to fasten the superstructure bearing base plate 16 to carrier bearing base plate 18. In an engaged position, the lock pin 4 restricts movement of the cab 3 and the superstructure bearing base plate 16 when an operator desires to steer the carrier chassis 19.

The hardware between the steering wheel 6 and steering box 14 includes a mechanical steering link 8 which includes a first shaft 10 and a second shaft 12. The first shaft 10 is connected to the wheel 6 while the second shaft 12 is connected to the steering box 14. This conventional design requires at least two separate actions of the operator to engage or disengage steering control from the cab 3: (1) an operator must exit the cab 3 in order to engage or disengage the mechanical steering link 8; and (2) the operator must locate the lock pin 4 and disengage or engage lock pin 4 depending upon the desired operation.

The conventional design allows an operator to disengage the lock pin 4 from the carrier bearing base plate 18 to permit rotation of the cab 3 and superstructure bearing base plate 16 while the first shaft 10 and second shaft 12 are connected. Such a situation where the mechanical steering link 8 operatively connects the steering box 14 to the steering wheel 6 while the lock pin 4 is disengaged from the carrier bearing base plate 18 can result in substantial or permanent damage to the mechanical steering link 8.

Accordingly, a need in the art exists for a work transfer lock system and method thereof for engaging and transferring steering control from a actuator on a first platform to a second steering device on a second platform while limiting movement between the first platform and the second platform. Further, a need in the art exists for a work transfer lock system and method thereof which substantially reduces the amount of manual labor required in engaging and disengaging a steering link between a steering device on a superstructure and a steering device on a chassis or carrier.

SUMMARY OF THE INVENTION

A work transfer lock system according to the present invention includes a first work device, a second work device, a first platform, and a second platform, and means for locking the first platform and the second platform. The locking means further includes means for transferring work from the first work device to the second work device. When the locking means is in a first position, movement of the first platform relative to the second platform is substantially limited while work energy is exchanged via the locking means between the first work device and the second device. When the locking means is in a second position, the first platform is freely moveable relative to the second platform while the first work device is disengaged from the second work device.

A vehicle steering control system includes a vehicle, a first platform disposed on the vehicle, a second platform disposed on the vehicle, a first steering control device disposed on the first platform, a second steering control device disposed on the second platform, and means for engaging and transferring steering actuation from the first steering control device to the second steering control device. The engaging means is disengagable from the second steering control device. When the engaging means is in the first position, movement of the first platform relative to the second platform is substantially limited while steering control is exchanged via the engaging means between the first steering control device and the second steering control device. When the engaging means is in the second position, the first platform is freely moveable relative to the second platform while the first steering control device is disengaged from the second steering control device.

A method of engaging and disengaging work devices includes the steps of: locking a first platform relative to a second platform with a work transmitting device, transferring work between a first work device and a second work device with the work transmitting device, and unlocking the first platform relative to the second platform while disengaging the first work device from the second work device.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
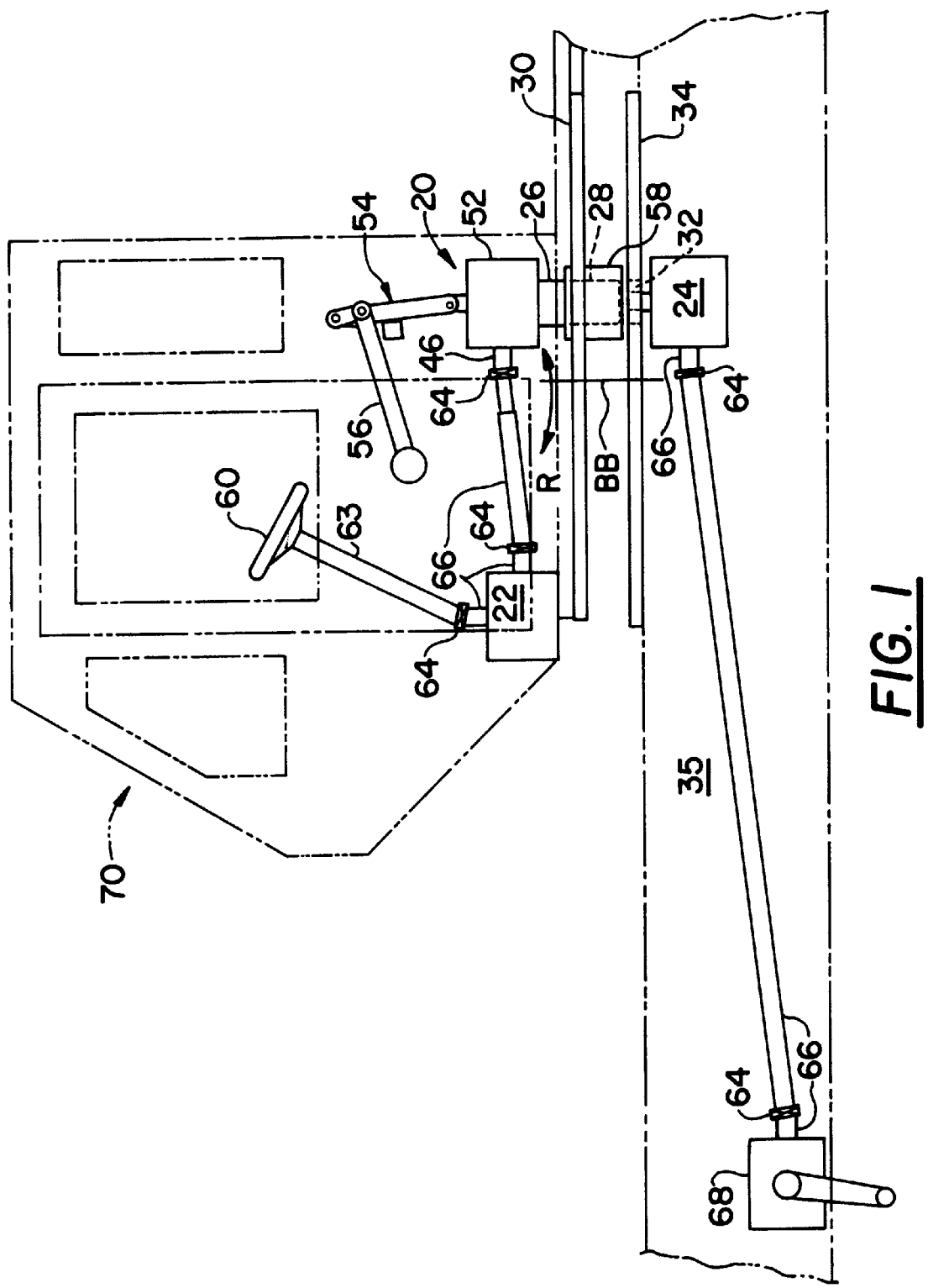
FIG. 1 is a side view of the work transfer lock system of the present invention employed in a crane environment.
Figure 2:
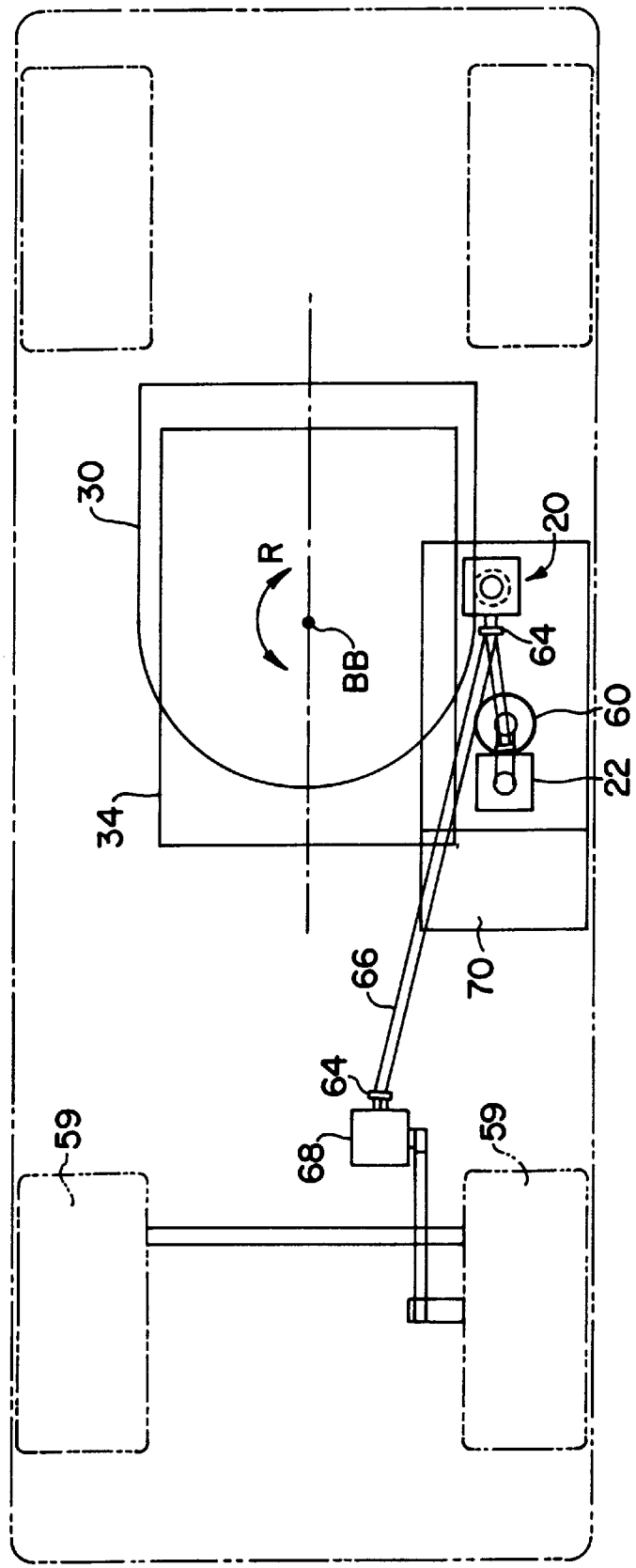
FIG. 2 is an elevational view of the present invention in a crane environment.

Referring in detail to the drawings and with particular reference to FIG. 1 and FIG. 2, a cab 70 is mounted on a superstructure bearing base plate 30. The superstructure bearing base plate 30 is rotatably mounted on a carrier bearing base plate 34. The superstructure bearing base plate 30 is rotatable about a rotation axis BB. The superstructure bearing base plate 30 can rotate either clockwise or counter clockwise as indicated by directional arrow R.

When the cab 70 and the superstructure bearing base plate 30 are not rotated, an operator can steer a carrier chassis 35 with a steering wheel 60. The steering mechanism of the present invention is not limited to the wheel 60 and can include other steering mechanisms. Other steering mechanisms include, but are not limited to, rod-type levers with linkages, keypads, joysticks, and other like steering mechanisms.

The carrier chassis 35 includes a steering box 68 which is operatively linked to the steering wheel 60 when an operator desires to steer the carrier chassis 35 from the cab 70. The steering wheel 60 is connected to a steering column 63. The steering column 63 is connected to a first steering device 22. The present invention includes a work transfer lock system 20 which engages and transfers energy from the first steering device 22 in cab 70 to a second steering device 24 disposed on the carrier chassis 35. The work transfer lock system includes a lock pin 26 which penetrates through an aperture 28 of the superstructure bearing base plate or first platform 30. The lock pin 26 also penetrates through a second aperture 32 within the carrier bearing base plate or second platform 34.

In one possible embodiment, the work transfer lock system 20 is used in a crane which employs a truck-type base or movable carrier type base for travel between work sites as illustrated in FIGS. 1 and 2. The present invention may be employed in self-propelled hydraulic cranes with moveable bases, but the present invention is not limited to these types of cranes. Other cranes in which the present invention may be employed include, but are not limited to, rough-terrain cranes, all-terrain cranes, industrial cranes, city cranes, locomotive cranes, truck cranes which include tower cranes, conventional cranes, and other boom type lifting and people moving devices.

The invention is also not limited to the field of cranes. Other fields in which the present invention may be employed include, but are not limited to, hoisting machines, robotics, towing devices, actuators for civil engineering structures such as bridges, aerial platforms, lift platforms, heavy-duty construction or earth moving equipment such as back-hoes and/or bulldozers, and other like environments which include relatively movable first and second platforms.

The work transfer lock system preferably connects the first steering device 22 on the first platform 30 to the second steering device 24 on the second platform 34. However, the work transfer lock system in the present invention is not limited to steering systems. Other types of systems include, but are not limited to, any work devices such as power transmissions for moving a vehicle, work transfer systems for generating lifting movement of a crane, and other like systems.

The first steering device 22 is operatively linked to the work transfer lock system 20 via a series of shafts 66, universal joints 64, and a lock coupler shaft 46. The work transfer lock system 20 includes a casing 52 and a hollow lock pin 26. The work transfer lock system is moveable according to a moving device or actuator linkage 54 and an actuator handle 56. The actuator linkage 54 and actuator handle 56 are mounted to a wall of the cab 70.

The hollow lock pin 26 is engageable with an outer sleeve 58 and the second steering device 24. The outer sleeve 58 is disposed within the aperture 28 of the first platform 30. The second steering device 24 is operatively linked to the chassis steering box 68 via a series of shafts 66 and universal joints 64.

Figure 3:
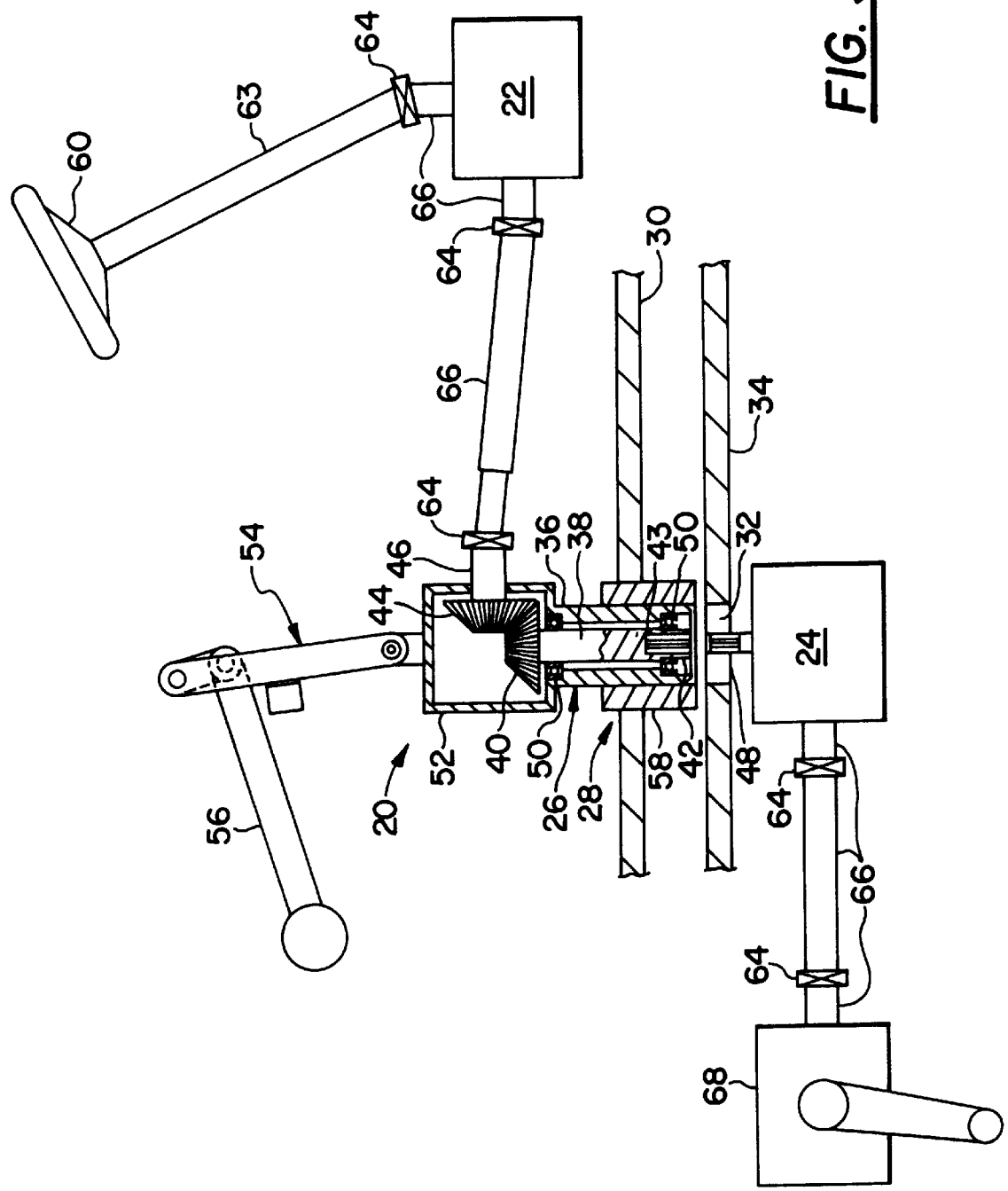
FIG. 3 is a side view of the work transfer lock system of the present invention in a first or disengaged position.
Figure 4:
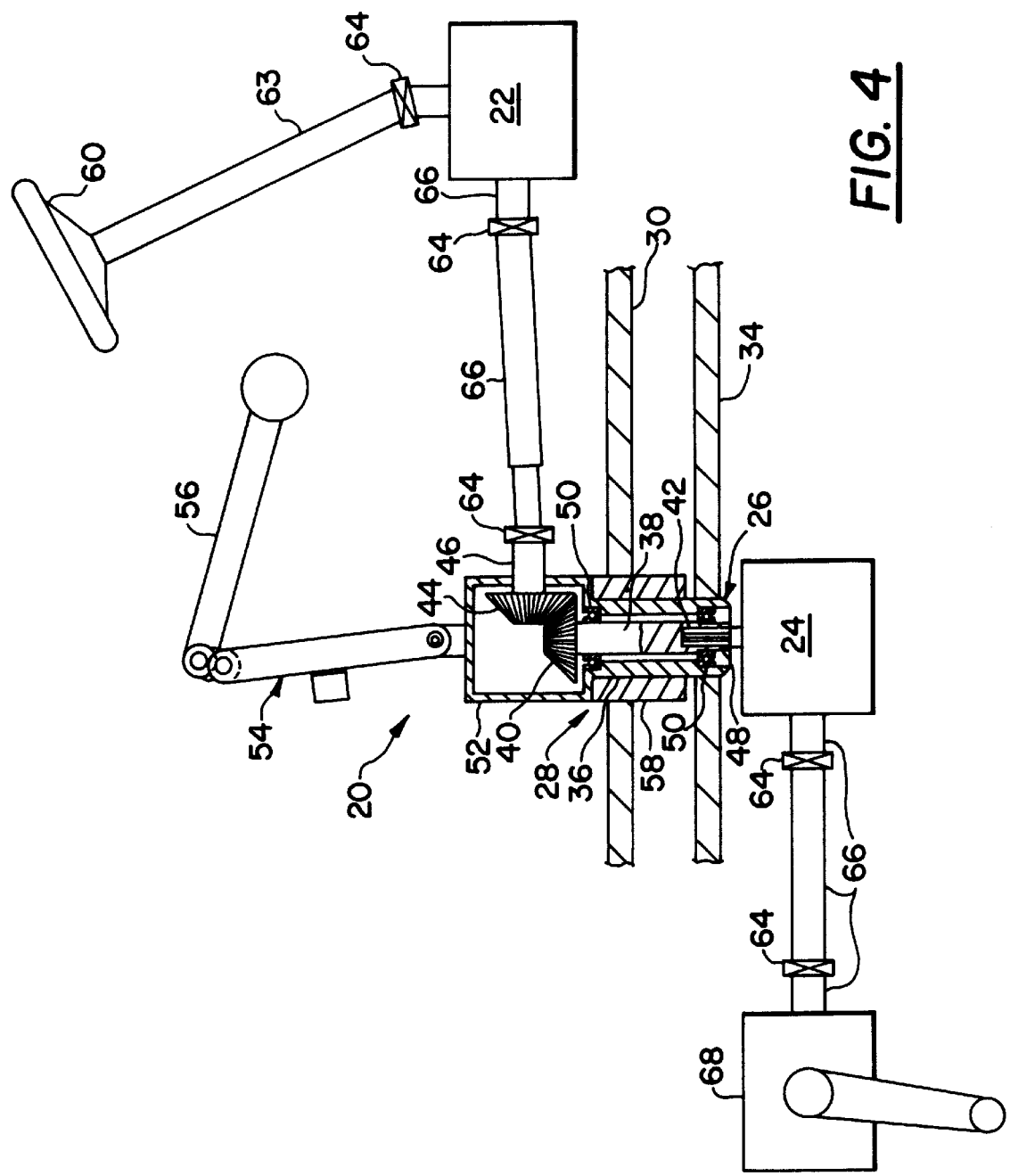
FIG. 4 is a side view of the work transfer lock system of the present invention in a second or engaged position side.
Figure 5:
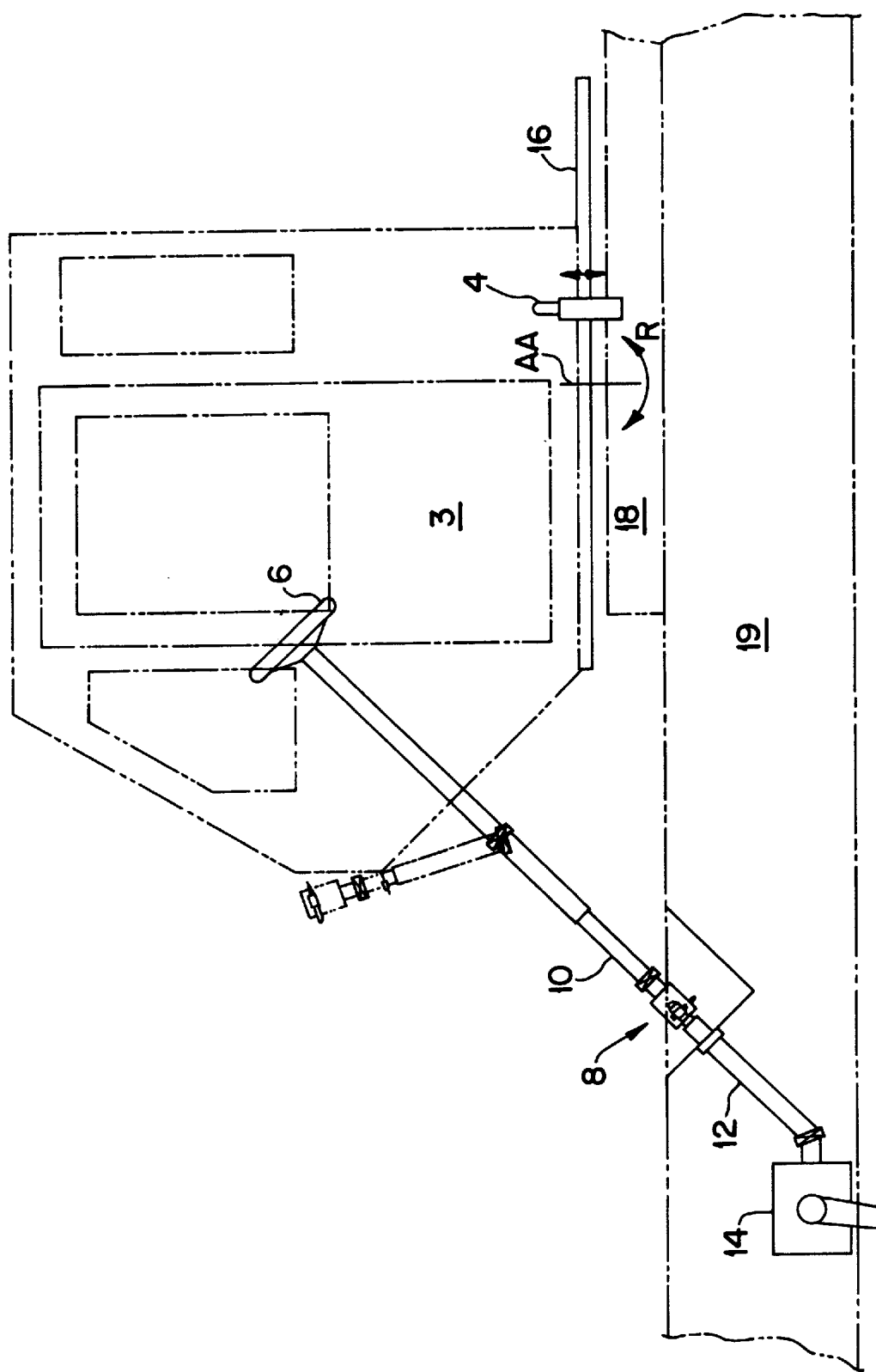
FIG. 5 is a side view of a conventional steering link.

The hollow lock pin 26 illustrated in detail in FIGS. 3 and 4 preferably includes a sleeve 36 and a drive shaft 38. The present invention is not limited to a drive shaft 38 and can include other drive mechanisms. Other drive mechanisms can include, but are not limited to, multiple gears, a combination of shafts and gears, belt drives, and other power transmitting devices. The present invention is also not limited to connecting mechanical steering control systems. Other steering control systems include, but are not limited to, pneumatic and hydraulic systems that employ conduits for transferring fluid energy, and electrical systems that employ at wires enclosed by conduits. The lock pin or engaging means 26 is not limited to the sleeve 36 and drive mechanism 38, but may include other structures which facilitate work transfer while limiting movement between two work devices such as the first steering device 22 and second steering device 24. In the preferred embodiment, drive shaft 38 has a first end 40 and a second end 42.

The first end 40 of the drive mechanism preferably includes a helical gear which engages with a helical gear of a first end 44 of the lock coupler shaft 46. The second end 42 of driving mechanism 38 preferably includes a splined opening or aperture 43 which is engageable with a gear 48 of the second steering device 24. The drive mechanism 38 is rotatably supported within the sleeve 36 by roller contact bearings 50.

Bearings 50 which support the drive mechanism 38 are preferably roller contact bearings having balls as the rolling elements between an inner ring and outer ring. However, other bearings are not beyond the scope of the present invention. Other bearings include, but are not limited to, double-roller bearings, internal self-aligning double-roller bearings, contact bearings, ball bushings, split-type ball bearings, cylindrical roller bearings, needle roller bearings, tapered-roller bearings, spherical-roller bearings, ball thrust bearings, straight-roller thrust bearings, paper-roller thrust bearings, fluid film bearings such as incompressible plane cylindrical journal bearings, thrust bearings, linear sliding bearings, gas-lubricated bearings, and other like bearing structures.

The sleeve 36 is connected to a casing 52 which encloses the first end 40 of the drive mechanism 38 and the lock coupler shaft 46. The casing 52 is coupled to the moving device 54 which includes the handle actuator 56. The casing 52 is preferably hollow and is empty with respect to the first ends of the drive mechanism 38 in lock coupler shaft 46. However, it is not beyond the scope of the present invention to seal casing 52 and fill the inside thereof with gearing lubricant such as oil and/or oil mixtures. The casing 52 preferably is a steel enclosure made of plates bolted together. However, other structures are not beyond the scope of the present invention. Other casing structures include, but are not limited to, steel enclosures which are made of steel plates welded together, and other like structures.

The moving device 54 is preferably an actuator linkage which is operable by moving the handle 56. The actuator linkage 54 moves the casing 52 and the sleeve 36 of the lock pin 26 into and out of a first and second position. The moving device or actuator linkage 54 is not limited to a single link or linkages. Other moving devices include, but are not limited to, piston-cylinder arrangements, clips, and/or fasteners, hinges, and other like displacing devices. The inner sleeve 36 and outer sleeve 58 of the present invention are not limited to steel materials.

An outer sleeve 58 within the aperture 28 of the first platform 30 facilitates the movement of the inner sleeve 36 into and out of aperture 28 of the first platform 30 and aperture 32 of the second platform 34. The inner sleeve 36 and outer sleeve 58 are preferably made of steel. While the preferred materials for inner sleeve 36 and outer sleeve 58 are steel, other materials are not beyond the scope of the present invention. Other materials include, but are not limited to, other ferrous alloys, non-ferrous alloys, ceramic materials, polymers, and composite materials.

The inner sleeve 36 and outer sleeve 58 can further include coatings which facilitate sliding engagement between the inner sleeve and outer sleeve. Such coatings can include, but are not limited to, Teflon™ (synthetic resinous fluorine-containing polymers used as coatings to reduce friction between sliding members), plastic coatings, and seals which enclose a lubricant such as oil and other like structures which facilitate sliding and/or torsional movement.

The outer sleeve 58 is preferably rigidly attached to the first platform 30 by fastening mechanisms such as welds. However other fastening mechanisms are not beyond the scope of the present invention. Other fastening mechanisms include, but are not limited to, bolts, screws, adhesives, brackets, and other like fastening mechanisms.

FIG. 3 illustrates one position (usually referred to as the second position) of the work transfer lock system of the present invention where the lock pin 26 is disengaged from the second platform 34 and the gear 48 of the second steering device 24. When the work transfer lock system is in this first position, the first platform 30 is free to rotate relative to the second platform 34. Furthermore, even if a steering wheel 60 is operated while the work transfer lock system is in the first position, the work energy transferred from the steering wheel 60 through the first steering device 22 and through a longitudinal shaft 66 and the lock coupler shaft 46 will have no detrimental effect upon the system since the second end 42 of the driving mechanism 38 remains disengaged from the gear 48 of the second steering device 24.

In the preferred embodiment, the first steering device 22 and second steering device 24 are gear boxes which facilitate energy transfer between skewed, rotating shafts. Universal joints 64 are used in the present invention to connect shafts with much larger values of misalignment that can not be tolerated by other types of flexible couplings. As illustrated in FIG. 3, the second steering device 24 includes universal joints 64 which link the shafts 66 to a carrier steering box 68.

In FIG. 4, another position (usually referred to as the first position) of the work transfer lock system is illustrated. In this position, carrier steering box 68 is operably linked to steering wheel 60 after actuation of handle 56 which displaces actuator linkage 54. The actuator linkage 54 moves casing 52 towards the first platform 30 and moves sleeve 36 through the aperture 28 in the first platform 30, and through aperture 32 in the second platform 34. The splined opening or aperture 43 of the second end 42 of the driving mechanism 38 engages with the gear 48 of the second steering device 24.

Upon movement of steering wheel 60, the first steering device 22 transfers steering control energy through shafts the 66 and the lock coupler shaft 46 where the first end 44 of lock coupler shaft 46 engages with first end 40 of drive mechanism 38. The drive mechanism 38 then transfers this steering control energy to the gear 48 of the second steering device 24. The second steering device 24 then transfers this steering control energy through shafts 66 to the carrier steering box 68. Steering box 68 is operatively linked to wheels 69. Meanwhile, sleeve 36 which penetrates through aperture 32 of the second platform 34 substantially limits movement of the first platform 30 relative to the stationery second platform 34. In this preferred embodiment, steering of a crane and control of a work transfer lock system 20 can be accomplished within the cab 70 without a need for an operator to exit the cab 70.

With the present invention, a work transfer lock system and method thereof engages or disengages steering control from a first steering device to a second steering device while limiting movement of a first platform relative to a second platform. This work transfer lock system and method substantially reduces the amount of operator time and work required in connecting a first steering device of a first platform to a second steering device of a second platform.

The system and method also substantially reduces the possibility of injuries or damage to machinery sometimes associated with the engagement and disengagement of a first platform relative to a second platform. The work transfer lock system and method provide an indicator to an operator that a mechanical steering link is either positively engaged or disengaged.

The present invention provides a work transfer lock system and method thereof which permits an operator to engage and/or disengage a turntable lock pin with the movement of a single and/or simple actuator. The present invention also provides a work transfer lock system and method thereof which substantially reduces accidental damage of a steering link when a turntable lock pin is disengaged from a chassis or carrier.

The invention being thus described, it will be obvious that the same may be varied in many ways. Such variations are not to be regarded as a departure from the spirit and scope of the invention, and all such modifications as would be obvious to one skilled in the art were intended to be included within the scope of the following claims.

What is claimed is:

1. A work transfer lock system comprising:
   a first work device;
   a second work device;
   a first platform;
   a second platform; and
   locking means for preventing movement of said first platform relative to said second platform when in a first position, for transferring work energy from said first work device to said second work device in said first position, for allowing movement of said first platform relative to said second platform when in a second position, and for preventing a transfer of work energy from said first work device to said second work device in said second position.

2. The work transfer lock system as in claim 1, wherein said first work device is disposed on said first platform and said second work device is disposed on said second platform.

3. The work transfer lock system as in claim 1, wherein said first work device includes a first steering transmission and said second work device includes a second steering transmission.

4. The work transfer lock system as in claim 1, wherein said locking means comprises:
   a casing; and
   a drive mechanism being disposed within said casing and being engageable with said first work device and said second work device, said drive mechanism including a shaft rotatable about a longitudinal axis, said shaft including a first end and a second end, said first end including a helical gear, and said second end including a splined opening.

5. The work transfer lock system as in claim 1, wherein said locking means includes an inner sleeve and an outer sleeve.

6. The work transfer lock system as in claim 1, wherein said first and second work devices include rotatable shafts, said shafts engage with said locking means.

7. The work transfer lock system as in claim 1, wherein said first platform is rotatable relative to said second platform when said locking means is in said second position.

8. The work transfer lock system as in claim 1, further comprising means for moving said locking means from said first position to said second position and from said second position to said first position.

9. The work transfer lock system as in claim 8, wherein said moving means includes a handle and an actuator linkage.

10. A vehicle steering control system comprising:
    a vehicle;
    a first platform disposed on said vehicle;
    a second platform disposed on said vehicle;
    a first steering control device disposed on said first platform;
    a second steering control device disposed on said second platform; and
    steering transfer means for preventing movement of said first platform relative to said second platform when in a first position, for transferring steering control energy from said first steering control device to said second steering control device in said first position, for allowing movement of said first platform relative to said second platform when in a second position, and for preventing a transfer of steering control energy from said first steering control device to said second steering control device in said second position.

11. The vehicle steering control system as in claim 10, wherein said first steering control device includes a first gear box and said second steering control device includes a second gear box.

12. The vehicle steering control system as in claim 10, wherein said steering transfer means comprises:
    a casing; and
    a drive mechanism being disposed within said casing and being engageable with said first work device and said second work device, said drive mechanism including a shaft rotatable about a longitudinal axis, said shaft including a first end and a second end, said first end including a helical gear, and said second end including a splined opening.

13. The vehicle steering control system as in claim 10, wherein said first and second steering control devices include rotatable shafts, said shafts couple with said steering transfer means.

14. The vehicle steering control system as in claim 10, wherein said first platform is rotatable relative to said second platform when said engaging means is in said second position.

15. The vehicle steering control system as in claim 10, further comprising means for moving said steering transfer means from said first position to said second position and from said second position to said first position.

16. The vehicle steering control system as in claim 10, wherein said vehicle includes a crane structure and said first platform is a rotatable superstructure and said second platform is a bearing base plate on a carrier structure of said vehicle.

17. The vehicle steering control system as in claim 16, wherein said means for moving includes a linkage and a handle.

18. A method of engaging first and second work devices comprising:
    locking a first platform associated with a first work device relative to a second platform associated with a second work device with a work transmitting device; and
    operably engaging said first work device and said second work device with each other with said work transmitting device.

19. The method as in claim 18, wherein operably engaging said first work device and said second work device further comprises the moving said work transmitting device through an aperture in said first platform and an aperture in said second platform.

* * * * *